US010173653B2

(12) United States Patent
Biller

(10) Patent No.: US 10,173,653 B2
(45) Date of Patent: Jan. 8, 2019

(54) METHOD FOR DETERMINING A PRESSURE/VOLUME CHARACTERISTIC CURVE OF A WHEEL BRAKE

(71) Applicant: Continental Teves AG & Co. oHG, Frankfurt (DE)

(72) Inventor: Harald Biller, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 240 days.

(21) Appl. No.: 14/382,609

(22) PCT Filed: Feb. 28, 2013

(86) PCT No.: PCT/EP2013/054058
§ 371 (c)(1),
(2) Date: Sep. 3, 2014

(87) PCT Pub. No.: WO2013/131805
PCT Pub. Date: Sep. 12, 2013

(65) Prior Publication Data
US 2015/0166024 A1    Jun. 18, 2015

(30) Foreign Application Priority Data

Mar. 6, 2012 (DE) .......................... 10 2012 203 495
Feb. 27, 2013 (DE) .......................... 10 2013 203 189

(51) Int. Cl.
*B60T 8/172* (2006.01)
*B60W 30/14* (2006.01)
(Continued)

(52) U.S. Cl.
CPC .............. *B60T 8/172* (2013.01); *B60T 7/042* (2013.01); *B60T 7/12* (2013.01); *B60T 8/00* (2013.01);
(Continued)

(58) Field of Classification Search
None
See application file for complete search history.

(56) References Cited

U.S. PATENT DOCUMENTS 5,234,261 A * 8/1993 Leyes ................. B60T 8/17616
303/115.1
6,132,010 A * 10/2000 Holt ...................... B60T 8/4045
303/11

(Continued)

FOREIGN PATENT DOCUMENTS

DE    19956553    5/2001
DE    10147181    12/2002

(Continued)

OTHER PUBLICATIONS

International Search Report for PCT/EP2013/054058 dated Sep. 16, 2013.

(Continued)

*Primary Examiner* — Jelani A Smith
*Assistant Examiner* — Paul A Castro
(74) *Attorney, Agent, or Firm* — RatnerPrestia

(57) ABSTRACT

Method and system for determining a pressure/volume characteristic curve of a wheel brake in a motor vehicle brake system having an electrically controllable pressure supply device connected hydraulically to wheel brakes and can output a pressure medium volume for activating the wheel brakes. The pressure medium volume which is output by the pressure supply device can be determined. An electrically actuable inlet valve per wheel brake disconnects the connection between the wheel brake and the pressure supply device. During one or more service brake operations of the motor vehicle wheel brakes are activated by the pressure supply device, the pressure medium volume output by the pressure supply device in order to activate the wheel brakes is determined and the pressure/volume characteristic curves (Continued)

of the wheel brakes are determined on the basis of pressure medium volumes output by the pressure supply device during one or more service braking operations are determined.

14 Claims, 2 Drawing Sheets

(51) Int. Cl.
*B60T 7/04* (2006.01)
*B60T 13/14* (2006.01)
*B60T 13/66* (2006.01)
*B60T 13/68* (2006.01)
*B60T 13/74* (2006.01)
*B60T 17/02* (2006.01)
*B60T 8/40* (2006.01)
*B60T 7/12* (2006.01)
*B60T 8/00* (2006.01)
*B60T 8/17* (2006.01)
*B60T 8/32* (2006.01)
*B60T 8/36* (2006.01)
*B60T 8/48* (2006.01)
*B60T 8/50* (2006.01)
*B60T 13/12* (2006.01)
*B60T 17/22* (2006.01)

(52) U.S. Cl.
CPC *B60T 8/17* (2013.01); *B60T 8/32* (2013.01); *B60T 8/36* (2013.01); *B60T 8/40* (2013.01); *B60T 8/4081* (2013.01); *B60T 8/48* (2013.01); *B60T 8/50* (2013.01); *B60T 13/12* (2013.01); *B60T 13/14* (2013.01); *B60T 13/146* (2013.01); *B60T 13/662* (2013.01); *B60T 13/686* (2013.01); *B60T 13/745* (2013.01); *B60T 17/02* (2013.01); *B60T 17/22* (2013.01); *B60W 30/14* (2013.01); *B60T 2270/14* (2013.01); *B60T 2270/82* (2013.01)

(56) References Cited

U.S. PATENT DOCUMENTS

| | | | |
|---|---|---|---|
| 6,546,326 | B1 | 4/2003 | Gerdes |
| 8,788,172 | B2 | 7/2014 | Bohm |
| 2007/0252098 | A1 | 11/2007 | Schmidt |
| 2011/0239762 | A1* | 10/2011 | Rulka .................. B60T 8/172 73/497 |
| 2012/0013173 | A1 | 1/2012 | Leiber |
| 2012/0169112 | A1 | 7/2012 | Jungbecker |
| 2013/0080017 | A1 | 3/2013 | Bohm |
| 2013/0119752 | A1 | 5/2013 | Roll |
| 2013/0152569 | A1* | 6/2013 | Spieker ............... B60T 8/1755 60/327 |
| 2016/0016576 | A1* | 1/2016 | Howell ................ B60T 8/1703 701/3 |

FOREIGN PATENT DOCUMENTS

| | | | |
|---|---|---|---|
| DE | 102006057501 | | 11/2007 |
| DE | 1997701 | | 12/2008 |
| DE | 102011076675 | | 12/2011 |
| DE | 102011076952 | | 12/2011 |
| DE | 102011077329 | | 1/2012 |
| EP | 1463658 | | 10/2004 |
| GB | 2403520 | | 1/2005 |
| GB | 2403520 A | * | 1/2005 ........... B60T 8/4081 |
| JP | 2005512878 | | 5/2005 |
| WO | 2005054028 | | 6/2005 |
| WO | 2005063539 | | 7/2005 |
| WO | 2010091883 | | 8/2010 |
| WO | 2011029812 | | 3/2011 |

OTHER PUBLICATIONS

German Search Report dated Oct. 24, 2013 in counterpart German Application No. 10 2013 203 189.0, including partial translation.
Written Opinion of the International Searching Authority for International Application No. PCT/EP2013/054058.
Chinese Office Action for Chinese Application No. 201380013151.4, dated Jan. 26, 2017, including English translation, 22 pages.

* cited by examiner

METHOD FOR DETERMINING A PRESSURE/VOLUME CHARACTERISTIC CURVE OF A WHEEL BRAKE

CROSS REFERENCE TO RELATED APPLICATIONS

This application is the U.S. National Phase Application of PCT/EP2013/054058, filed Feb. 28, 2013, which claims priority to German Patent Application No. 10 2012 203 495.1, filed Mar. 6, 2012 and German Patent Application No. 10 2013 203 189.0, filed Feb. 27, 2013, the contents of such applications being incorporated by reference herein.

FIELD OF THE INVENTION

The invention relates to a method for determining a pressure/volume characteristic curve of a wheel brake in a brake system for motor vehicles and to a brake system.

BACKGROUND OF THE INVENTION

In motor vehicle engineering, "brake-by-wire" brake systems are becoming ever more widespread. Such brake systems often comprise not only a master brake cylinder which can be activated by the vehicle driver but also an electrically controllable pressure supply device by means of which the wheel brakes or the master brake cylinder is activated in the "brake-by-wire" operating mode. In order to give the vehicle driver a pleasant pedal sensation in the "brake-by-wire" operating mode, the brake systems usually comprise a brake pedal sensation simulation device. In these brake systems, the wheel brakes can also be activated on the basis of electronic signals without active participation by the vehicle driver. These electronic signals can be output, for example, by an electronic stability program or an adaptive cruise control system.

International patent application WO 2010/091883 A1, which is incorporated by reference, discloses a brake system with a brake booster whose master brake cylinder is driven mechanically by an electric motor. The master brake cylinder is hydraulically connected to four wheel brakes, wherein the wheel brakes can be disconnected from the master brake cylinder by means of a switching valve in each case. In order to operate the brake system, knowledge of the pressure/volume characteristic curve of the individual wheel brakes is important. In accordance with WO 2010/091883 A1, the pressure/volume characteristic curve is recorded individually for each wheel brake when the vehicle is in a stationary state, by detecting the volume given knowledge of the master brake cylinder pressure over the corresponding piston travel of the master brake cylinder. It is felt to be disadvantageous here that this method can be carried out only to a chronologically limited extent, specifically when the vehicle is stationary. Furthermore, the execution of this method is felt to be disadvantageous both when the brake pedal is activated and when the brake pedal is unactivated. In the case of an activated brake pedal, it is, under certain circumstances, impossible to obtain a sufficient braking effect via one wheel to stop the vehicle reliably. In the event of the brake system being currently serviced, the servicing personnel could be injured by the clamping force at the wheel brake in the case of a brake pedal which is unactivated. The method which is described in WO 2010/091883 A1 should therefore not be carried out during ongoing operation but only during servicing, with separate triggering.

SUMMARY OF THE INVENTION

An aspect of the present invention is a method for determining a pressure/volume characteristic curve of a wheel brake, which method can be carried out in the driving mode of the motor vehicle.

An aspect of the invention is based on the concept that during one or more service braking operations of the motor vehicle more than one wheel brake, but not always all the wheel brakes, are activated by the pressure supply device, that the pressure medium volume which is output by the pressure supply device in order to activate the wheel brakes is determined, and that the pressure/volume characteristic curves of the individual wheel brakes are obtained on the basis of pressure medium volumes which are determined in such a way.

An aspect of the invention provides the advantage that the determination of the pressure/volume characteristic curves of the individual wheel brakes can be carried out during normal service braking operations since as a result of at least two wheel brakes being activated by the pressure supply device, the motor vehicle can be braked in a sufficiently stable fashion given a suitable selection of the wheel brakes.

A pressure/volume characteristic curve of a wheel brake is understood according to the invention to be the pressure medium requirement or the capacity of the wheel brake as a function of the brake pressure, or in other words the relationship between the brake pressure (corresponds to the braking torque) and the pressure medium requirement or volume requirement of the wheel brake. Knowledge of this relationship makes it possible to convert a setpoint braking torque or a setpoint brake pressure into a setpoint pressure medium volume.

During one or more service braking operations, various groups of two or more wheel brakes are preferably activated by the pressure supply device. The pressure/volume characteristic curves of the individual wheel brakes are then obtained on the basis of the pressure medium volumes which are output by the pressure supply device in order to activate the various groups of wheel brakes. At least one of the groups of wheel brakes comprises here less than all the wheel brakes (subgroup). The pressure medium volume which is output and the pressure which is achieved thereby are each particularly preferably detected during the entire braking process and stored, advantageously during the pressure buildup and the pressure reduction. It is generally intended that the vehicle driver does not notice that just one subgroup of wheel brakes is activated for the purpose of braking, with the result that the method for determining the pressure/volume characteristic curves of the wheel brakes can be carried out essentially unnoticed by the driver during normal service braking operations.

So that the method can be carried out as imperceptibly as possible for the vehicle driver, the pressure which is built up in the respective group of activated wheel brakes by means of the pressure supply device is set in such a way that the (total) braking deceleration which is requested by the vehicle driver is achieved even if fewer than all the wheel brakes (i.e. a subgroup of wheel brakes) are activated. In addition to a braking deceleration which is requested by the vehicle driver, for example via the brake pedal, the braking deceleration may also have been requested by a braking function, for example by an adaptive cruise control function.

For reasons of safety and in order to reduce the probability of irritating the vehicle driver, the method is preferably carried out during service braking operations at vehicle speeds which are lower than a predefined threshold value. The method is particularly preferably carried out exclusively at low vehicle speeds.

In order to obtain a pressure medium volume which is output by the pressure supply device, the pressure supply device is connected to a group of two or more wheel brakes, while the pressure supply device is disconnected from the other wheel brake/brakes. A pressure buildup in the group of wheel brakes which is connected to the pressure supply device is then implemented by means of the pressure supply device.

According to one preferred embodiment of the method according to the invention, the various groups of wheel brakes are activated in chronological succession by the pressure supply device. This can take place during one or more service braking operations.

According to one advantageous development of the invention, different pressures are applied to the groups of wheel brakes by the pressure supply device during one or more service braking operations, wherein the respective pressure of the pressure supply device is measured. For this purpose, the pressure supply device is particularly preferably assigned a pressure sensor. Alternatively or additionally, a pressure sensor can be arranged in each brake circuit, with the result that the pressure of the pressure supply device and of the wheel brakes connected thereto can be determined by means of these brake circuit pressure sensors. The groups of wheel brakes are preferably each activated with various pressures by the pressure supply device, and the respective pressure medium volume which is output by the pressure supply device in order to activate the group with the pressure is determined. On the basis of these pressure medium volumes, the pressure/volume characteristic curves of the individual wheel brakes can then be determined.

In order to determine the pressure/volume characteristic curves of all the wheel brakes, the number of various groups of wheel brakes is preferably equal to or larger than the number of all the wheel brakes. Correspondingly, the pressure medium volumes which are output by the pressure supply device in order to activate the groups are preferably obtained for at least the number of different wheel brake groups.

For a pressure value, the capacity for each wheel brake is preferably obtained from the associated, determined pressure medium volumes on the basis of a linear equation system. If the number of different groups of wheel brakes whose group capacity has been measured is larger than the number of wheel brakes, this equation system is overdetermined. The overdetermined equation system is advantageously solved approximately according to the method of the least mean squares. This makes the method more robust with respect to measuring errors.

In the event of a group of wheel brakes comprising precisely two wheel brakes, it is preferred if the group comprises two wheel brakes which are located diagonally opposite one another or the two front wheel brakes. Then, during braking the wheel brakes which are located diagonally opposite one another or the two front wheel brakes are activated, as a result of which the vehicle can be braked in a stable fashion even when only two wheel brakes are activated.

In order to avoid unstable braking operations, none of the groups of wheel brakes preferably comprises more than one braked rear-axle wheel brake, and only a single braked front-axle wheel brake.

A method according to an aspect of the invention for obtaining the pressure/volume characteristic curves of the wheel brakes, i.e. the corresponding activation of the wheel brakes, in particular groups of wheel brakes, by the pressure supply device is preferably aborted as soon as a brake pressure control function is requested or becomes necessary. A method according to the invention is advantageously aborted immediately if an anti-lock brake control process or a vehicle movement dynamics control process is initiated or activated. This ensures the safety and vehicle stability during the braking operation.

According to one development of the method according to the invention, during one or more braking operations, particularly preferably at a plurality of predefined or predetermined pressures, different groups of two or more wheel brakes are connected to the pressure supply device, while the other wheel brakes are disconnected from the pressure supply device and the pressure medium volume which is output by the pressure supply device in order to activate the respective group of wheel brakes is determined. On the basis of the pressure medium volumes which are output by the pressure supply device, the capacity is obtained, particularly preferably as a function of the pressure, for each individual wheel brake.

The pressure supply device is preferably formed by a cylinder-piston arrangement whose piston can be activated by an electromechanical actuator, wherein the pressure medium volume which is output by the pressure supply device is determined by means of a travel-detection device or a position-detection device which detects a variable which characterizes a position of the piston.

The method according to an aspect of the invention is preferably carried out in a brake system with at least two brake circuits, in which brake system each brake circuit is connected to a master brake cylinder via a hydraulic connecting line with an isolating valve, which is advantageously open in the currentless state, and to the pressure supply device via a further hydraulic connecting line with a sequence valve, which is advantageously closed in the currentless state.

An aspect of the invention also relates to a brake system having a pressure supply device and an electronic open-loop and closed-loop control unit in which a method according to the invention is carried out.

The brake system comprises per wheel brake an electrically actuable inlet valve by means of which a connection between the wheel brake and the pressure supply device can be connected or disconnected. In the non-actuated state of the inlet valve, the wheel brake is preferably connected to the pressure supply device.

The brake system preferably also comprises per wheel brake an electrically actuable outlet valve by means of which a connection between the wheel brake and a pressure medium reservoir container can be connected or disconnected. The outlet valves are advantageously shut off in the non-actuated state.

The pressure supply device is preferably formed by a piston-cylinder arrangement whose piston can be activated by an electromechanical actuator. It is therefore possible for the pressure medium volume which is output by the pressure supply device to be easily determined by means of a travel-detecting device or a position-detecting device, particularly preferably a rotor position-detecting device which detects a variable which characterizes a position of the piston.

A brake system for motor vehicles which can be actuated in a so-called "brake-by-wire" operating mode can be actuated both by the vehicle driver and independently of the vehicle driver, preferably in the "brake-by-wire" operating mode and can be operated in at least one fallback operating mode in which operation is only possible by the vehicle driver.

The brake system preferably comprises a pedal travel simulator which gives the vehicle driver a pleasant braking pedal sensation in the "brake-by-wire" operating mode. The pedal travel simulator is particularly preferably of hydraulic design and is or can be connected to the master brake cylinder. The pedal travel simulator is advantageously designed such that it can be switched on and off by means of a simulator release valve.

BRIEF DESCRIPTION OF THE DRAWINGS

Further preferred embodiments of the invention can be found in the dependent claims and the following description with reference to figures.

In the drawings, in a schematic form.

DETAILED DESCRIPTION OF THE PREFERRED EMBODIMENTS

Figure 1:
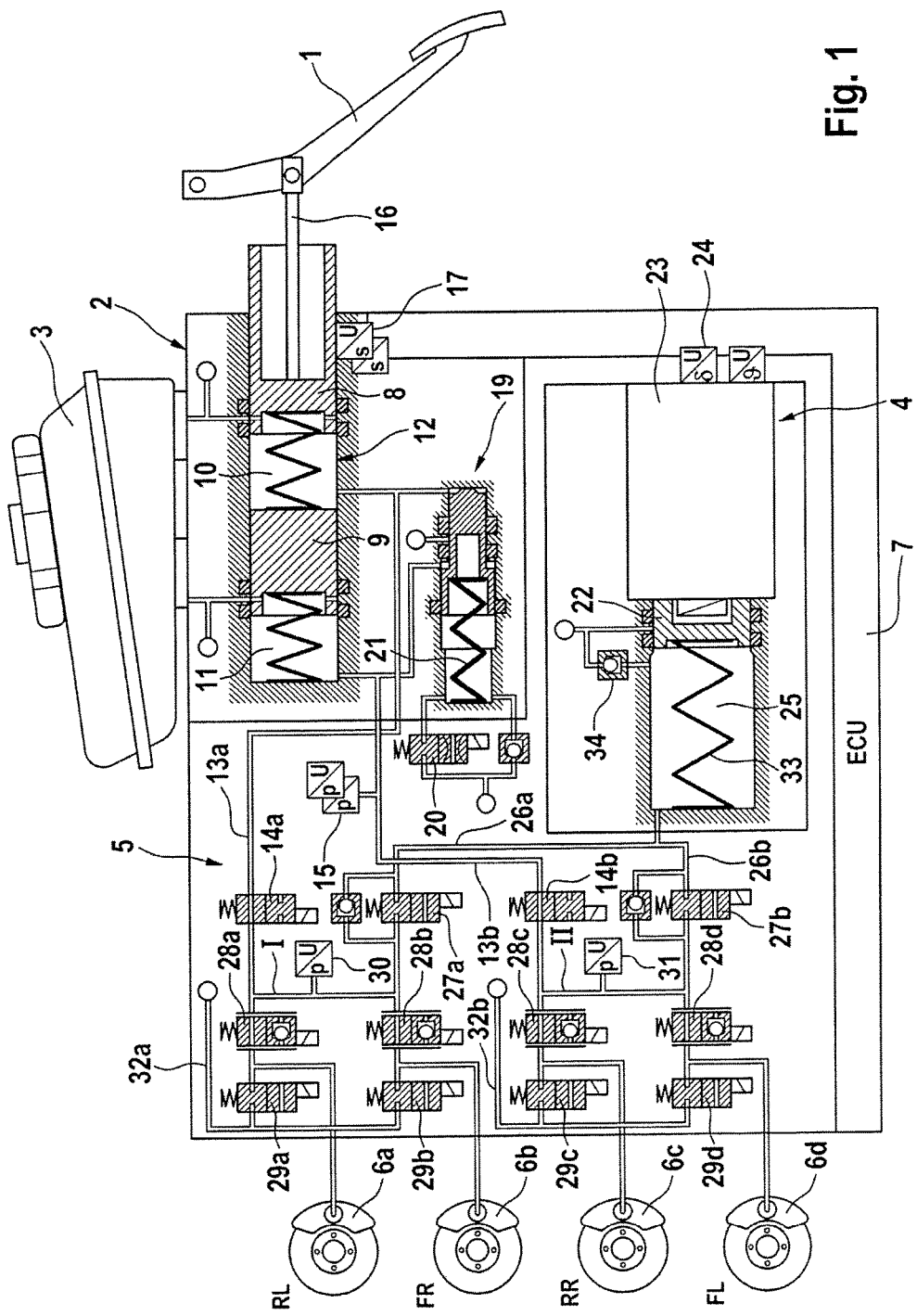
FIG. 1 shows an exemplary brake system for carrying out a method according to the invention.

FIG. 1 is a schematic illustration of an exemplary brake system for carrying out a method according to the invention. The brake system comprises an activation device 2 which can be activated by a vehicle driver by means of an activation pedal or brake pedal 1, a pressure medium reservoir container 3 which is assigned to the activation device 2, an electrically controllable pressure supply device 4, an electrically controllable pressure modulation device 5, to whose output terminals wheel brakes 6a-6d of a motor vehicle (not illustrated) are connected, and an electronic open-loop and closed-loop control unit 7 (ECU: electronic control unit) which serves to process sensor signals and to actuate the electrically controllable components.

The actuation device 2 comprises a dual-circuit master brake cylinder or tandem master cylinder 12 with two pistons 8, 9 which are arranged one behind the other in a (master brake cylinder) housing and which bound hydraulic pressure chambers 10, 11. The pressure chambers 10, 11 are connected to the pressure medium reservoir container 3 via radial bores which are formed in the pistons 8, 9, wherein these bores can be shut off by means of a relative movement of the pistons 8, 9 in the housing. Furthermore, each pressure chamber 10, 11 is connected by means of a hydraulic line 13a, 13b to hydraulically activatable wheel brakes 6a, 6b; 6c, 6d by means of a hydraulic line 13a, 13b with a brake circuit section I, II with two wheel brake circuits in each case. In each case an isolating valve 14a, 14b for disconnecting the hydraulic connection between the pressure chamber 10, 11 of the master brake cylinder 12 and the associated wheel brakes 6a, 6b; 6c, 6d is inserted into the hydraulic lines 13a, 13b, said isolating valve 14a, 14b being embodied as an electrically activatable 2/2 way valve which is preferably open in the currentless state. A pressure sensor 15 which is connected to the pressure space 11 and is preferably of redundant design detects the pressure which is built up in the pressure space 11 as a result of the shifting of the second piston 9, which pressure corresponds to the pedal force generated by the driver. Furthermore, the pressure chambers 10, 11 accommodate restoring springs (not denoted in more detail) which prestress the pistons 8, 9 in the opposite direction to the activation direction. A piston rod 16 which is coupled to the brake pedal 1 interacts with the first (master cylinder) piston 8, wherein a variable which characterizes the activation travel of the brake pedal 1, e.g. the activation travel or angle of the brake pedal 1 itself or the activation travel of the piston 8 which is coupled to the brake pedal, is detected by a travel sensor 17, which is preferably of redundant design.

For example, the wheel brake 6a is assigned to the left-hand rear wheel (RL), the wheel brake 6b to the right-hand front wheel (FR), the wheel brake 6c to the right-hand rear wheel (RR) and the wheel brake 6d to the left-hand front wheel (FL). Other ways of apportioning the brake circuits are conceivable.

The activation device 2 also comprises a pedal travel simulator 19 which interacts with the master brake cylinder 12 and communicates a pleasant pedal sensation to the vehicle driver in a first operating mode (what is referred to as "brake-by-wire" operating mode). The pedal travel simulator 19 can, for example, be activated hydraulically and is connected to at least one pressure chamber 10, 11 of the master brake cylinder 12. The pedal travel simulator 19 can be switched on and off by means of an electrically activatable simulator release valve 20.

The pedal travel simulator 19 is, for example, composed essentially of two simulator chambers, a simulator spring chamber with a simulator spring 21 and a simulator piston (stepped piston) which disconnects the chambers from one another. In this context, the simulator chambers are connected to, in each case, one pressure chamber 10, 11 of the master brake cylinder 12, while the simulator spring chamber can be connected to the pressure medium reservoir container 3 with intermediate connection of the simulator release valve 20. The simulator release valve 20 is embodied as a 2/2 way valve which can be activated electrically and is preferably closed in the currentless state.

The electrohydraulic pressure supply device 4 is embodied as a hydraulic cylinder-piston arrangement whose piston 22 can be activated by a schematically indicated electric motor 23 with the intermediate connection of a rotation-translation gear mechanism (not illustrated). The electric motor 23 and the rotation-translation gear mechanism form a linear actuator, wherein a sensor 24, which is embodied, for example, as a rotor position sensor 24 which serves to detect the rotor position of the electric motor 23, is present for the detection of a variable which is characteristic of the position of the piston 22 of the pressure supply device 4. The piston 22 bounds a pressure space 25 which can be connected to the brake circuit sections I, II via hydraulic lines 26a, 26b with, in each case, one electrically activatable sequence valve 27a, 27b. In this context, in each case a non-return valve, which closes toward the pressure space 25, is connected in parallel with the sequence valves 27a, 27b. Furthermore, the pressure space 25 is connected to the pressure medium reservoir container 3 via a non-return valve 34 which closes toward the latter. The sequence valves 27a, 27b are embodied as electrically activatable 2/2 way valves, which are preferably closed in the currentless state. A spring 33, which loads the piston 22 in the opposite direction to the pressure buildup direction, is arranged in the pressure space 25.

A pressure medium volume $V_{DQ}$, which is output by the pressure supply device 4 in order to activate the wheel brakes 6a-6d, can be determined by means of the sensor 24 and knowledge of the transmission ratio of the rotation-translation gear mechanism.

In order to modulate the pressure at the wheel brakes 6a-6d, the hydraulic pressure modulation device 5 comprises, for example, one inlet valve 28*a*-28*d* and one outlet valve 29*a*-29*d* per wheel brake 6. The input connections of the inlet valves 28*a*-28*d* or the brake circuit sections I, II can be supplied with the pressure of the master brake cylinder 12 (via the lines 13*a*, 13*b* with the isolating valves 14*a*, 14*b*) or the pressure of the pressure supply device 4 (via the lines 26*a*, 26*b* with the sequence valves 27*a*, 27*b*). The outlet connections of the outlet valves 29*a*-29*d* are connected to the pressureless pressure medium reservoir container 3 via return lines 32*a*, 32*b*. In addition it is also to be noted that the circular symbols (outside the wheel brakes and the non-return valves) represent hydraulic lines leading to the pressure medium reservoir container 3. The inlet valves 28*a*-28*d* are advantageously embodied as electrically activatable pressure-regulating valves which are open in the currentless state, and the outlet valves 29*a*-29*d* are embodied as electrically activatable 2/2 way valves which are closed in the currentless state.

For example, a pressure sensor 30, 31 for detecting the pressure prevailing at the inlet connections of the associated inlet valves 28*a*, 28*b*; 28*c*, 28*d* is arranged in each brake circuit section I, II. Alternatively it is conceivable that a pressure sensor is arranged in just one of the two brake circuit sections I, II. Alternatively or additionally, a pressure sensor can be arranged in the line 26*a*, 26*b* between the pressure space 25 and the sequence valves 27*a*, 27*b*. By means of this pressure sensor or these pressure sensors it is possible to determine the pressure of the pressure supply device 4 in what is referred to as a "brake-by-wire" operating mode.

In the "brake-by-wire" operating mode, the pressure of the pressure supply device 4 is applied to the brake circuit sections I, II. For this purpose, for example the sequence valves 27*a*, 27*b* are opened, with the result that the pressure supply device 4 is hydraulically connected to the brake circuit sections I, II. The master brake cylinder 12 is disconnected from the brake circuit sections I, II or the wheel brakes 6*a*-6*d* by means of the closed isolating valves 14*a*, 14*b*. The simulator release valve 20 is opened, with the result that the pedal travel simulator 19 is activated or switched on. When the brake pedal 1 is activated by the vehicle driver, pressure medium volume is forced from the pressure chambers 10, 11 of the master brake cylinder 12 into the simulator chambers of the pedal travel simulator 19. In the case of normal braking, in which a method for determining a pressure volume characteristic curve is not carried out, the inlet valves 28*a*-28*d* of all the wheel brakes 6*a*-6*d* are opened and the pressure supply device 4 is actuated by means of the electronic open-loop and closed-loop control unit 7 in order to supply a setpoint pressure p to be applied to all the wheel brakes 6*a*-6*d*. The value of the setpoint pressure p of the pressure supply device 4 is determined, for example in the electronic open-loop and closed-loop control unit 7, on the basis of the driver's braking request which is determined, for example, by means of the sensors 15 and 17. The pressure medium volume $V_{DQ}$ which is output by the pressure supply device 4 into the wheel brakes 6*a*-6*d* which are connected thereto by opened inlet valves 28*a*-28*d* can be determined on the basis of the directly or indirectly detected position of the piston 22 of the pressure supply device 4 (for example by means of rotor position sensor 24).

It is advantageous for the open-loop and/or closed-loop control of the exemplary brake system if for each wheel brake 6*a*-6*d* the capacity is known individually as a function of the pressure, referred to as the pressure/volume characteristic curve $V_i(p)$ of the wheel brake i (where i=6*a*, 6*b*, 6*c*, 6*d* or i=RL, FR, RR, FL).

Figure 2:
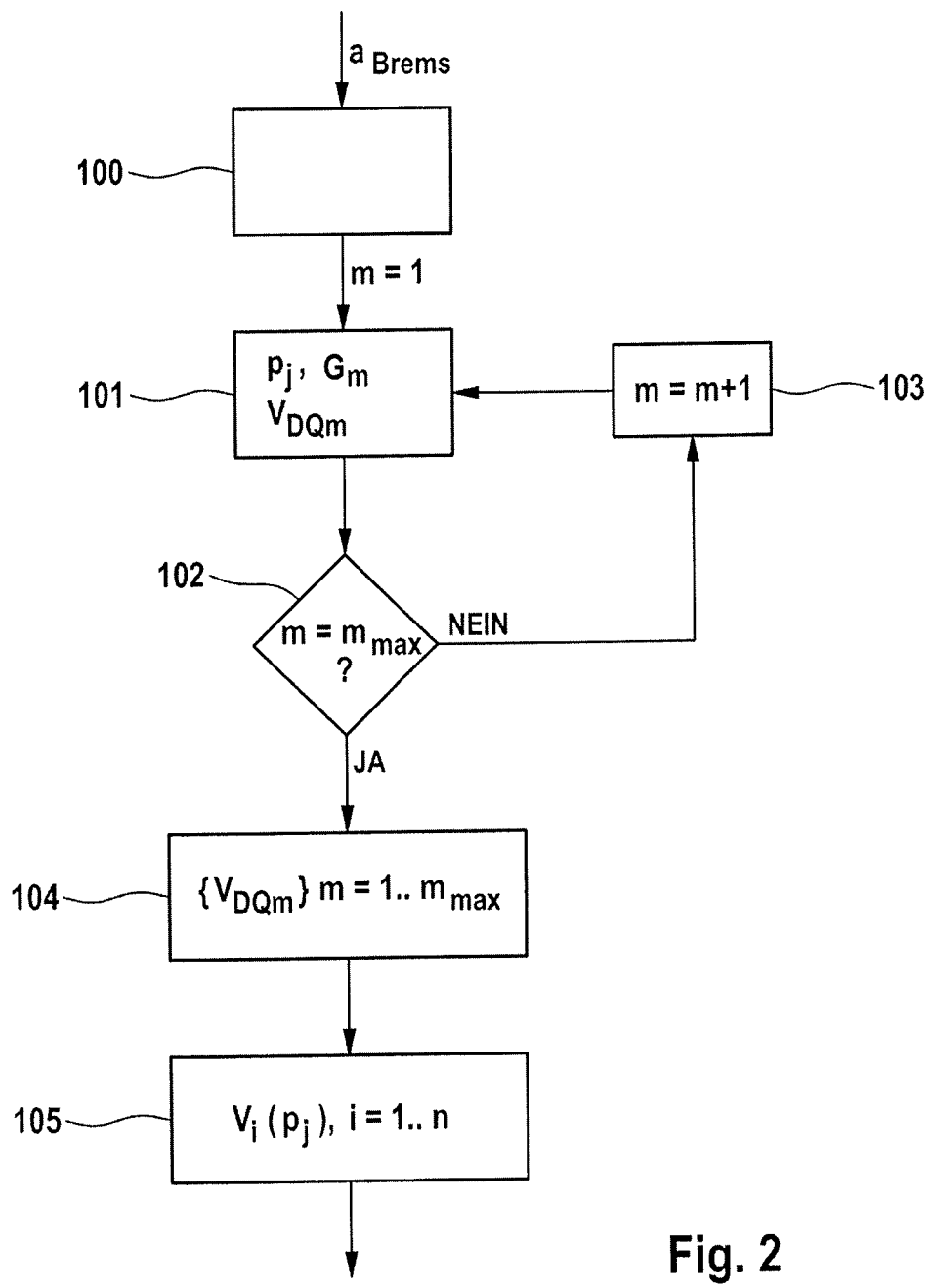
FIG. 2 shows a block circuit diagram illustrating an exemplary method.

FIG. 2 is a schematic block circuit diagram illustrating an exemplary method for determining the pressure/volume characteristic curves $V_i(p)$ of the wheel brakes i=1, 2, ... n (for example n=4 wheel brakes where i=RL, FR, RR, FL). If during the normal operation of the motor vehicle by the vehicle driver or a braking function, for example an adaptive cruise control function, a braking deceleration $a_{Brake}$ is required, a corresponding pressure buildup and, if appropriate a subsequent reduction in pressure, is carried out by wheel brakes with pressure values $p_j$ in specific groups $G_m$ where m=1 to $m_{max}$.

The pressure is increased here in such a way that the deceleration corresponds to the value which the driver or the requesting function expects (block 100). The respective value $p_j$ of the pressure of the pressure supply device 4 can be measured with a pressure sensor and/or monitored as has already been described in relation to FIG. 1.

In order to set a pressure profile in a group $G_m$ of wheel brakes, the wheel brakes associated with the group $G_m$ are connected in block 101 by their inlet valves to the pressure supply device 4, and the other wheel brakes are disconnected from the pressure supply device 4 by their inlet valves. In this context, the pressure medium volume $V_{DQm}$ which is output by the pressure supply device 4 in order to activate the wheel brake group $G_m$ is determined per pressure value $p_j$ and stored.

For each predefined group $G_m$ of wheel brakes, i.e. for m=1, 2, ..., $m_{max}$, the pressure medium volume $V_{DQm}$ which is output by the pressure supply device 4 in order to activate the wheel brake group $G_m$ is determined per pressure value $p_j$ and stored. That is to say in FIG. 2 the blocks 101, 102, 103 are run through until in block 102 it is detected that for the last group $G_m$ where m=$m_{max}$ a pressure medium volume $V_{DQm}$ has been determined for a pressure $p_j$ (YES in interrogation 102). In block 104, the values of the pressure medium volumes $V_{DQm}$ which are output by the pressure supply device 4 in order to activate the wheel brake group $G_m$ are then present for m=1, 2, ..., $m_{max}$ for the pressure $p_j$. In block 105, the wheel volumes $V_i$ of the wheel brakes i=1, 2, ..., n (for example n=4 wheel brakes where i=RL, FR, RR, FL; that is to say wheel volumes $V_{FL}$, $V_{FR}$, $V_{RL}$, $V_{RR}$) for the corresponding pressure $p=p_j$ are determined from the pressure medium volumes $V_{DQm}$.

In order to obtain the complete pressure/volume characteristic curves $V_i(p)$ of the wheel brakes, the described procedure (measurement of the pressure medium volumes $V_{DQm}$ of the wheel brake groups and determination of the wheel volumes $V_i$) is carried out at various pressure values $p_j$, for example during various service braking operations. If the wheel volumes $V_i$ are present at a sufficiently large number of pressure values, the pressure/volume characteristic curves $V_i(p)$ can be determined, for example by interpolation or the method of the least mean squares.

In the case of normal braking, the pressure buildup is therefore carried out in specific (different) groups $G_m$ of wheel brakes. The capacity of the individual wheel brakes $V_i$ is calculated from the capacity $V_{DQm}$ of a plurality of (different) wheel brake groups $G_m$ at various pressures of the pressure supply device.

One possible selection of the wheel brake groups in the case of four wheel brakes (n=4, where FL means front left, FR means front right, RR means rear right and RL means rear left) is composed of the group $G_1$ which comprises all four wheel brakes FL, FR, RR, RL, and the groups $G_2$, $G_3$, $G_4$ and $G_5$, which each comprise three different wheel brakes. For each wheel brake group (m) the pressure medium volume $V_{DQm}$ which is output by the pressure supply device 4 in order to activate the wheel brake group is composed of the sum of the wheel volumes $V_i$ which are taken up by the wheel brakes associated with the group (m). Correspondingly, the following equation system is produced:

| Group | | |
|---|---|---|
| $G_1$ | (1) | $V_{DQ1} = V_{FL} + V_{FR} + V_{RL} + V_{RR}$ |
| $G_2$ | (2) | $V_{DQ2} = V_{FL} + V_{FR} + V_{RL}$ |
| $G_3$ | (3) | $V_{DQ3} = V_{FL} + V_{FR} + V_{RR}$ |
| $G_4$ | (4) | $V_{DQ4} = V_{FL} + V_{RL} + V_{RR}$ |
| $G_5$ | (5) | $V_{DQ5} = V_{FR} + V_{RL} + V_{RR}$ |

The wheel volumes $V_{FL}$, $V_{FR}$, $V_{RL}$, $V_{RR}$ are then determined from the measured volumes $V_{DQ1}$, $V_{DQ2}$, $V_{DQ3}$, $V_{DQ4}$ and $V_{DQ5}$ on the basis of the equation system. This is a system with four unknowns ($V_{FL}$, $V_{FR}$, $V_{RL}$, $V_{RR}$) and five equations, one equation of which can be dispensed with in each case.

Since a vehicle at which a front wheel and both rear wheels are braked is inclined to experience an instability, it is particularly advantageous to dispense with the abovementioned wheel brake groups $G_4$ and $G_5$, in each of which just one front wheel is unbraked. Instead, pressure is built up, for example, in just one diagonal, i.e. the wheel brake groups $G_{4'}$ and $G_{5'}$, which each comprise two wheel brakes FL, RR and FR, RL lying diagonally opposite one another, are used alternatively. As a result the following equation system is produced:

| Group | | |
|---|---|---|
| $G_1$ | (1) | $V_{DQ1} = V_{FL} + V_{FR} + V_{RL} + V_{RR}$ |
| $G_2$ | (2) | $V_{DQ2} = V_{FL} + V_{FR} + V_{RL}$ |
| $G_3$ | (3) | $V_{DQ3} = V_{FL} + V_{FR} + V_{RR}$ |
| $G_{4'}$ | (4) | $V_{DQ4} = V_{FL} + V_{RR}$ |
| $G_{5'}$ | (5) | $V_{DQ5} = V_{FR} + V_{RL}$ |

One of the equations (1), (4) or (5) for evaluating/determining the wheel volumes $V_{FL}$, $U_{FR}$, $V_{RL}$, $V_{RR}$ can also be dispensed with here.

The resulting linear equation systems are preferably solved by storing the inverses of the system matrices which can be read above in a software package of the open-loop and closed-loop control unit.

Alternatively, the overdetermined equation system can be solved approximately according to the method of the least mean squares.

Instead of a wheel brake group $G_{4'}$ or $G_{5'}$, which comprises two wheel brakes FL, RR and FR, RL, lying diagonally opposite one another, a wheel brake group can also comprise just the two front wheel brakes.

The method for determining the pressure/volume characteristic curves of the wheel brake, in particular the pressure buildup in a subgroup of wheel brakes (i.e. in the case of fewer than all the wheel brakes) is carried out according to the example only in the case of normal braking operations. The method is advantageously carried out if braking is performed at low vehicle speeds. When a vehicle movement dynamic closed-loop control function (for example a wheel-specific brake pressure closed-loop control operation) occurs, the process is aborted.

For example, a method is proposed by means of which the capacity can be obtained as a function of the pressure for each individual wheel brake while the vehicle is operating. Since the pressure buildup does not occur in just one wheel during normal operation and also should not be carried out randomly for reasons of stability of the motor vehicle, for this purpose various groups of, in each case, at least two wheel brakes are activated by the pressure supply device preferably during one or more service braking operations of the motor vehicle.

The invention claimed is:

1. A method for determining a pressure/volume characteristic curve (Vi(p)) of one or more of a plurality of wheel brakes in a brake system for a motor vehicle comprising:
   an electrically controllable pressure supply device which is connected hydraulically to the plurality of wheel brakes and can output a first pressure medium volume (VDQ) for activating the plurality of wheel brakes, wherein the first pressure medium volume which is output by the pressure supply device can be determined, and
   an electrically actuatable inlet valve for each of the plurality of wheel brakes for disconnecting the connection between each wheel brake and the pressure supply device,
   wherein the method comprises:
   during one or more service braking operations of the motor vehicle occurring when the motor vehicle is in motion, activating at least two different groups (GM) of two or more of the plurality of wheel brakes by the pressure supply device at various pressures;
   determining second pressure medium volumes (VDQm) which are output by the pressure supply device in order to activate each of the at least two different groups; and
   determining pressure/volume characteristic curves (Vi(p)) of each of the wheel brakes in the at least two different groups during the one or more service braking operations on the basis of the second pressure medium volumes which are output by the pressure supply device to activate the at least two different groups of wheel brakes.

2. The method as claimed in claim 1, wherein in order to obtain a pressure medium volume (VDQm) which is output by the pressure supply device the pressure supply device is connected to one of the at least two different groups of two or more of the plurality of wheel brakes, while the pressure supply device is disconnected from wheel brake/brakes not included in the one of the at least two different groups, and a pressure buildup in the one of the at least two different groups of wheel brakes is implemented by the pressure supply device.

3. The method as claimed in claim 1, wherein the at least two different groups (Gm) of wheel brakes are activated in chronological succession by the pressure supply device.

4. The method as claimed in claim 1, wherein during the one or more service braking operations the at least two different groups (Gm) of wheel brakes are activated with different pressures (pj) by the pressure supply device, wherein the respective pressure of the pressure supply device is measured.

5. The method as claimed in claim 1, wherein one of at least two different groups of two wheel brakes comprises wheel brakes which are diagonally opposite one another.

6. The method as claimed in claim 1, wherein one of the at least two different groups of two wheel brakes comprises the two wheel brakes of a front axle.

7. The method as claimed in claim 1, wherein none of the at least two different groups of wheel brakes comprises at least two rear-axle wheel brakes and just a single front-axle wheel brake.

8. The method as claimed in claim 1, wherein a pressure (pj) which is built up in a respective one of the at least two different groups (Gm) of activated wheel brakes by the pressure supply device is set in such a way that the braking deceleration (aBrake) requested by a vehicle driver or a braking function is achieved.

9. The method as claimed in claim 1, wherein said method is carried out exclusively during braking operations at vehicle speeds which are lower than a predefined threshold value.

10. The method as claimed in claim 1, wherein the activation of the wheel brakes by the pressure supply device for obtaining the pressure/volume characteristic curves (Vi(p)) of the wheel brakes is interrupted as soon as a an anti-lock brake control process or a vehicle movement dynamics control process, is requested.

11. The method as claimed in claim 1, wherein the number (mmax) of different ones of the at least two different groups (Gm) of wheel brakes is selected to be equal to or larger than the number (n) of wheel brakes.

12. The method as claimed in claim 1, wherein the capacity (Vi) for each wheel brake is obtained for a predefined or predetermined pressure (pj), from the determined pressure medium volumes on the basis of a linear equation system.

13. The method as claimed in claim 1, wherein a pressure (pj) which is built up in a respective one of the at least two different groups (Gm) of activated wheel brakes by the pressure supply device is set to achieve an adaptive cruise control function.

14. A brake system for motor vehicles comprising:
an electrically controllable pressure supply device which is connected hydraulically to wheel brakes and can output a pressure medium volume (VDQ) for activating the wheel brakes, wherein the pressure medium volume which is output by the pressure supply device can be determined, and
a master brake cylinder which can be activated by a brake pedal is connected to the wheel brakes in a disconnectable fashion,
an electrically actuable inlet valve for each of the wheel brakes for disconnecting the connection between each wheel brake and the pressure supply device, and
an electronic open-loop and closed-loop control unit for actuating the electrically controllable pressure supply device and the inlet valves,
wherein the electronic open-loop and closed-loop control unit is configured to:
during one or more service braking operations of the motor vehicle occurring when the motor vehicle is in motion, activate at least two different groups (GM) of two or more of the plurality of wheel brakes by the pressure supply device at various pressures;
determine second pressure medium volumes (VDQm) which are output by the pressure supply device in order to activate each of the at least two different groups; and
determine pressure/volume characteristic curves (Vi(p)) of each of the wheel brakes in the at least two different groups during the one or more service braking operations on the basis of the second pressure medium volumes which are output by the pressure supply device to activate the at least two different groups of wheel brakes.

* * * * *